United States Patent
Laversane et al.

(10) Patent No.: US 10,242,772 B2
(45) Date of Patent: Mar. 26, 2019

(54) ASSEMBLY FOR TIGHTLY COVERING AN ELONGATE MEMBER WITH AN ELASTIC PROTECTION SLEEVE

(71) Applicant: SOCIETE INDUSTRIELLE DE CONSTRUCTION D'APPAREILS ET DE MATERIEL ELECTRIQUES, Pompadour (FR)

(72) Inventors: Hubert Laversane, Arnac Pompadour (FR); Piotr Gorecki, Terrasson-Lavilledieu (FR); Stephane Areias, Varetz (FR)

(73) Assignee: SOCIETE INDUSTRIELLE DE CONSTRUCTION D'APPARIELS ET DE MATERIEL ELECTRIQUES, Pompdour (FR)

( * ) Notice: Subject to any disclaimer, the term of this patent is extended or adjusted under 35 U.S.C. 154(b) by 133 days.

(21) Appl. No.: 14/859,963

(22) Filed: Sep. 21, 2015

(65) Prior Publication Data
US 2016/0086697 A1    Mar. 24, 2016

(30) Foreign Application Priority Data
Sep. 22, 2014  (FR) ...................... 14 58928

(51) Int. Cl.
*B23P 19/00* (2006.01)
*H01R 43/00* (2006.01)
(Continued)

(52) U.S. Cl.
CPC ............. *H01B 13/062* (2013.01); *H02G 1/14* (2013.01); *H02G 15/1826* (2013.01)

(58) Field of Classification Search
CPC .. H01B 13/062; G02B 6/4401; G02B 6/4444; H02G 15/013; H02G 1/14; H02G 15/076;
(Continued)

(56) References Cited

U.S. PATENT DOCUMENTS 3,783,487 A * 1/1974 May .................... H01R 4/20
                                                   174/84 C
7,767,909 B2 * 8/2010 Krabs ................... H01R 4/726
                                                   174/84 C
(Continued)

FOREIGN PATENT DOCUMENTS

| EP | 1 263 107 A1 | 12/2002 |
| FR | 2 926 410 A1 | 7/2009 |
| WO | 2006/029646 A1 | 3/2006 |

OTHER PUBLICATIONS

French Search Report, dated Jun. 4, 2015, from corresponding French Application.

*Primary Examiner* — Paul D Kim
(74) *Attorney, Agent, or Firm* — Young & Thompson (57) ABSTRACT

An assembly includes an elastic protection sleeve (211); two tubular cores (212, 212') for holding the sleeve (211) expanded; for each tubular core (212, 212'), a slide film (213, 213') placed between the sleeve (211) and the each core (212, 212'), to enable each core to slide relative to the sleeve; and a device (30) for holding the two cores (212, 212') in order for them to be able to move apart from each other, from the initial state in which they are end to end, until they are apart at most by a predetermined distance at which the inside diameter of the sleeve (211) between the first ends (217, 217') is at least similar to the inside diameter of the cores (212, 212'), whereby the assembly (210A) with the two cores (212, 212') thus apart can still be repositioned.

20 Claims, 5 Drawing Sheets

(51) Int. Cl.
*H01B 13/06* (2006.01)
*H02G 1/14* (2006.01)
*H02G 15/18* (2006.01)

(58) Field of Classification Search
CPC ... H02G 15/113; H02G 15/1826; H05K 5/068
See application file for complete search history.

(56) References Cited

U.S. PATENT DOCUMENTS

| | | | |
|---|---|---|---|
| 8,141,593 B2* | 3/2012 | Francois | H02G 15/1833 138/110 |
| 8,697,995 B2* | 4/2014 | Vallauri | H02G 15/1826 118/45 |
| 9,184,576 B2* | 11/2015 | Vallauri | H02G 15/1826 |
| 2009/0199397 A1 | 8/2009 | Franxois et al. | |

* cited by examiner

ASSEMBLY FOR TIGHTLY COVERING AN ELONGATE MEMBER WITH AN ELASTIC PROTECTION SLEEVE

FIELD OF THE INVENTION

The invention concerns fitting an elastic protection sleeve to an elongate member such as an electrical cable or two electrical cables joined together.

BACKGROUND OF THE INVENTION

Figure 1:
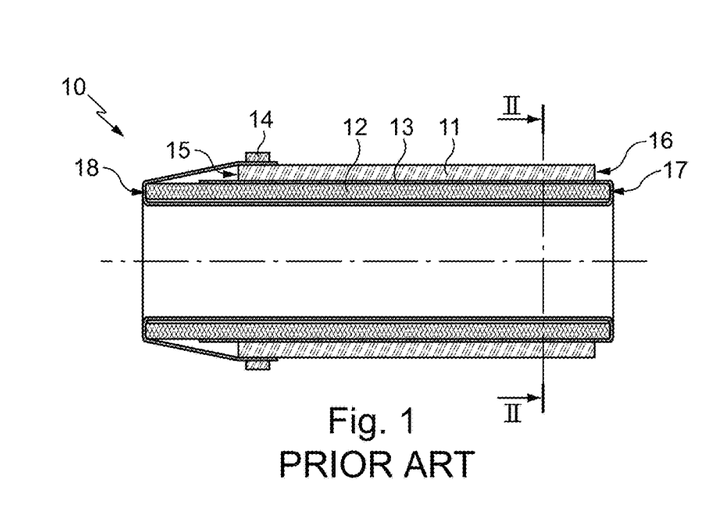
Figure 2:
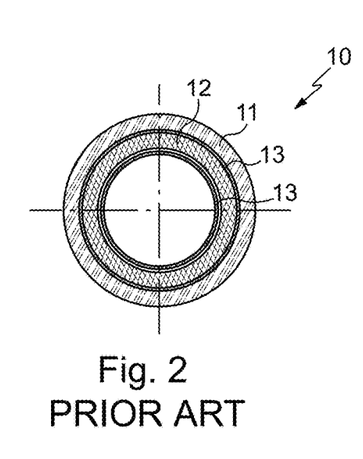
Figure 3:
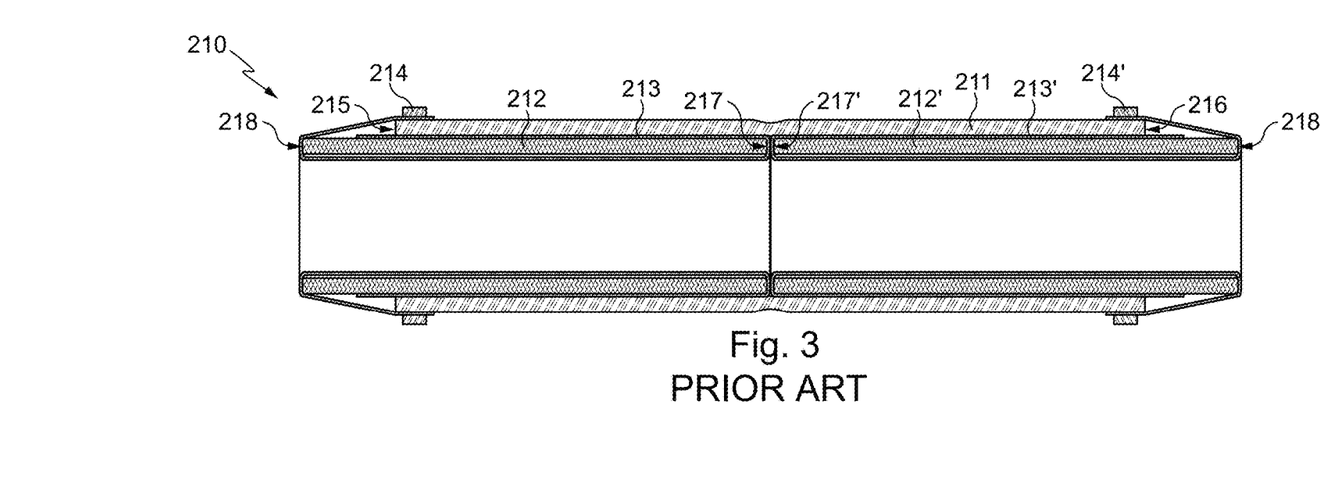
Figure 4:
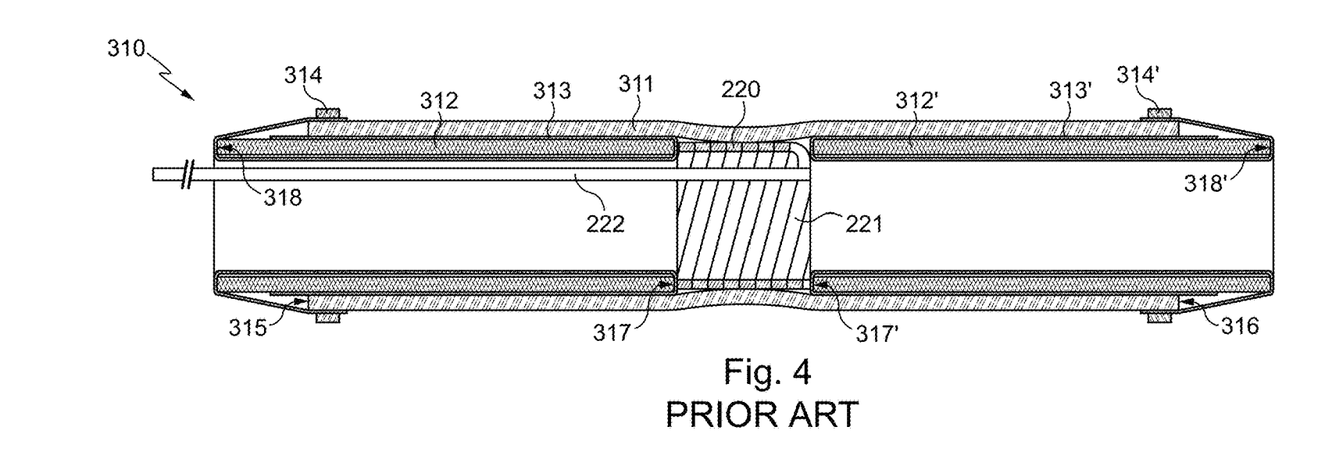
Figure 5:
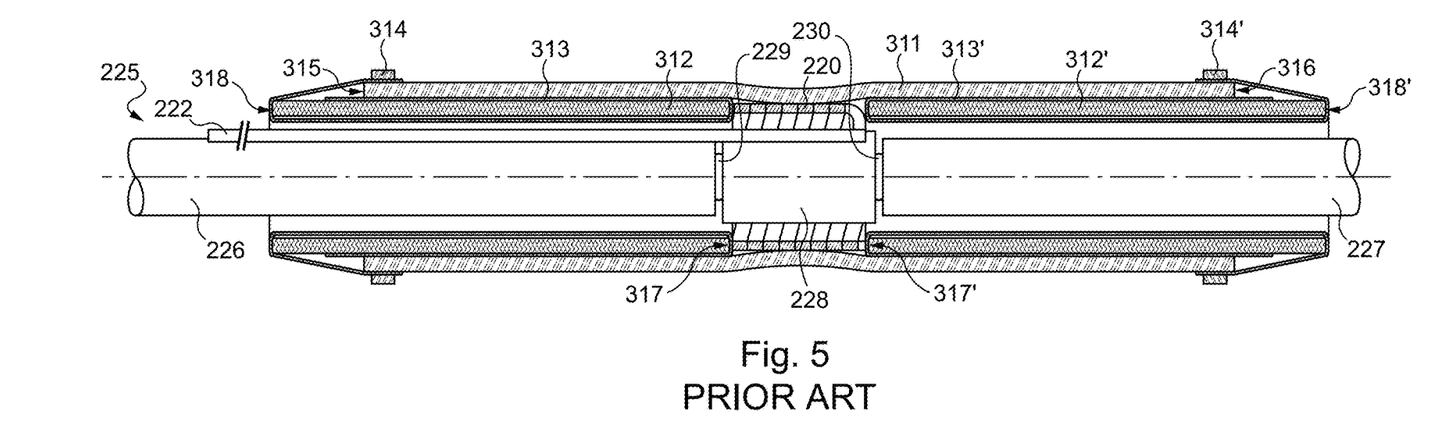
Figure 6:
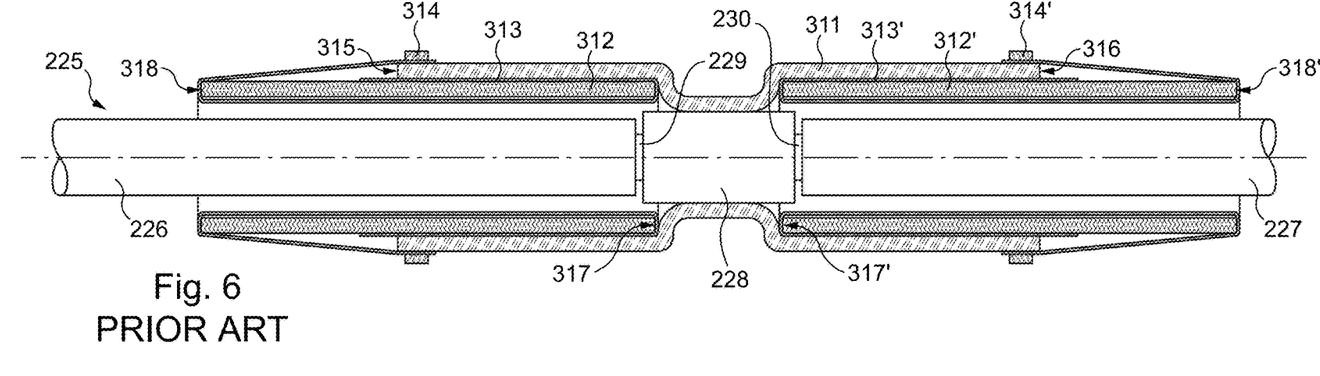

From French patent application 2 926 410 there is already known an assembly for performing such fitting, hereinafter described with reference to FIGS. 1 to 6 of the accompanying drawings. In these:

FIG. 1 is a view in longitudinal section of a first embodiment of that assembly;

FIG. 2 is a view in cross section identified by II-II in FIG. 1;

FIGS. 3 and 4 are views similar to FIG. 1, respectively showing a second embodiment and a third embodiment of that assembly;

FIG. 5 is a view similar to FIG. 4, but with an elongate member to be covered placed inside the assembly; and FIG. 6 is a view similar to FIG. 5 but showing the cores of the assembly being expelled by the sleeve.

The assembly 10 shown in FIG. 1 comprises an elastic protection sleeve 11, a tubular core 12, a film 13 with a low coefficient of friction, and an elastic ring 14 tightening the film 13 onto the external surface of the sleeve 11 in order to fasten it thereto.

The sleeve 11 is provided to cover tightly, as shown partially in FIG. 6 for the similar sleeve 311, an elongate member such as a section of electrical cable or two sections of electrical cables in order to provide electrical insulation, air-tightness and water-tightness.

The tubular core 12 serves to hold expanded the sleeve 11, that is to say in a radially dilated state relative to the state that it adopts in the absence of external load. The core 12 is thus tightly covered by the sleeve 11. The internal space of the core 12 is configured to receive internally the elongate member which must be covered by the protection sleeve 11.

The low friction coefficient film 13 is placed between the sleeve 11 and the core 12 to enable them to slide relative to each other.

The core 12 can therefore slide both relative to the elongate member placed therein and relative to the sleeve 11, so that the latter comes to tightly cover the elongate member, as explained in more detail below.

The core 12 extends beyond each of the ends 15 and 16 of the sleeve 11. The end 17 of the core 12 is relatively close to the corresponding end 16 of the sleeve 11 while the other end 18 of the core 12 is relatively far from the corresponding end 15 of the sleeve 11.

The proximity of the ends 16 and 17 is useful for starting the extraction of the core 12 in a simple and convenient way, which it is provided to be performed with the core 12 being driven relative to the sleeve 11 in the direction from the end 17 toward the end 18, as explained in more detail below.

The film 13 is placed between the elastic sleeve 11 and the core 12 over the whole length of the sleeve 11, that is to say between its ends 15 and 16. The film 13 continues slightly beyond the end 15. At the other side of the sleeve 11, the film 13 extends beyond the end 16 until it makes a half turn over the end 17 of the sleeve 12 situated in proximity to the end 16 then extends inside the core 12 to its other end 18 over which it makes a half-turn then extends outside the core 12 as far as the sleeve 11 to which it is fastened externally by the elastic ring 14

The assembly 210 shown in FIG. 3 will now be described. Generally speaking, the same reference numbers are used as for the assembly 10, but increased by 200.

In the assembly 210, the core 212, the film 213 and the elastic ring 214 are identical to the core 12, the film 13 and the ring 14, respectively.

The sleeve 211 differs from the sleeve 11 only in that it is substantially twice as long.

The assembly 210 further comprises a second tubular core 212', a second film 213' with a low coefficient of friction and a second elastic ring 214' identical to the core 212, the film 213 and the ring 214, respectively.

The core 212 extends beyond the end 215 of the sleeve 211 in the same way as the core 12 extends beyond the end 15 of the sleeve 11, the end 218 of the core 212 being relatively far away from the end 215 of the sleeve 211.

The core 212' also extends beyond the end 216 of the sleeve 211 in the same way as the core 12 extends beyond the end 15 of the sleeve 11, the end 218' of the core 212' being relatively far from the end 216 of the sleeve 211.

The end 212 and the core 212' are disposed end to end, that is to say that the end 217 and the end 217' are against each other or approximately so. It should be noted that the ends 217 and 217' are not in direct contact, since they are respectively covered by the film 213 and by the film 213'.

The end 217 of the core 212 and the end 217' of the core 212' are located more or less at the center of the sleeve 211.

Generally speaking, the arrangement of the sleeve 212', the film 213' and the elastic ring 214' is the mirror image of the arrangement of the core 212, the film 213 and the ring 214.

The following description in respect of the core 212, the film 213 and the ring 214 is equally valid for the core 212', the film 213' and the ring 214' subject to adding a "prime" symbol to their reference numbers and replacing the end 215 of the sleeve 211 by the end 216.

The film 213 is placed between the sleeve 211 and core 212 over the whole of the length over which they are in contact, that is to say between the end 215 of the sleeve 211 and the end 217 of the core 212.

The disposition of the film 213 relative to the core 212 and the sleeve 211 between the end 217 and the ring 214 is exactly the same as the disposition of the film 13 between the end 17 and the ring 14: the film 213 makes a half-turn over the end 217 and then extends inside the core 212 as far as the end 218, over which it makes a half-turn, after which it extends outside the core 212 as far as the sleeve 211 to which it is fastened by the elastic ring 214.

The assembly 310 shown in FIG. 4 will now be described, and then, with reference to FIGS. 5 and 6, how the sleeve 311 of the assembly 310 is fitted onto an elongate member. It will then be explained how to fit the sleeve 211 of the assembly 210 then how to fit the sleeve 11 of the assembly 10.

Generally speaking, the same reference numbers have been used for the assembly 310 as for the assembly 210, but increased by 100.

In the assembly 310, the cores 312 and 312', the films 313 and 313' and the elastic rings 314 and 314' are identical to the cores 212 and 212', the films 213 and 213' and the rings 214 and 214', respectively.

The sleeve 311 differs from the sleeve 211 only in that it is longer. The description given above for the arrangement of the core 212 relative to the sleeve 211 as well as for the arrangement of the film 213 relative to the sleeve 211, the core 212 and the ring 214 is also valid for the arrangement of the core 312 relative to the sleeve 311 as well as for the arrangement of the film 313 relative to the sleeve 311, the core 312 and the ring 314, subject to adding 100 to the reference numbers of that description. Similarly, the description given above for the arrangement of the core 212' relative to the sleeve 211 as well as for the arrangement of the film 213' relative to the sleeve 211, the core 212' and the ring 214' is also valid for the arrangement of the core 312' relative to the sleeve 311 as well as for the arrangement of the film 313' relative to the sleeve 311, the core 312', and the ring 314, subject to adding 100 to the reference numbers of that description.

In addition to the sleeve 311, the cores 312 and 312', the films 313 and 313' and the rings 314 and 314', the assembly 310 comprises a frangible ring 220 having a cross section of substantially the same shape as the cores 312 and 312' between and in line with which it is disposed in the manner of a spacer.

The end 317 of the core 312 is against the end of the ring 220 which can be seen on the left in FIG. 4 and the end 317' of the core 312' is against the end of the ring 220 which can be seen on the right in FIG. 4. It should be noted that the ends 317 and 317' are not in direct contact with the ring 220 since the ends 317 and 317' are respectively covered by the film 313 and by the film 313'.

The ring 220 is formed by a helical winding of a strip 221 whose edges are joined to each other in a tearable manner, one end of the strip 221 being at the end of the ring 220 that is against the core 312 (the end of the ring 220 that is seen on the left in FIG. 4), while at the other end of the ring 220 (the end seen on the right in FIG. 4), the strip 221 departs from the helical winding and extends longitudinally in the form of a strap 222 inside the ring 220 and then inside the core 312 until it projects from the end 318.

Applying traction to the end of the strap 222 that projects from the core 312 makes it possible to progressively unwind the winding that forms the ring 220, from the end seen on the right in FIG. 4 until it is completely unwound.

The ring 220 can therefore be entirely removed from the assembly 310, including when an elongate member is disposed inside the core 312 and the ring 220, as FIG. 5 shows.

In practice, the ring 220 is formed from a preexisting strip whose edges are lightly welded or the ring 220 is made from a tube on which a helical pre-cutting line is formed, the strap 222 being in one piece with the tube or attached to the material of the tube.

FIG. 5 represents an elongate member 225 inserted in the core 312, the ring 220 and the core 312'.

The member 225 is formed of two electrical cables 226 and 227 disposed end-to-end and of a splicing member 228 placed on bared end sections 229 and 230 of the cable 226 and the cable 227, respectively.

In the example shown, the cables 226 and 227 have no other accessible end sections such that one of the cables 226 and 27 was inserted into the assembly 310 first, the splicing member 228 was then fitted, and the assembly 310 was then positioned as shown in FIG. 5, that is to say with the sleeve 111 positioned longitudinally relative to the elongate member 225 at the location it is to adopt on that member.

For the sleeve 311 to cover the member 225, the end of the strap 222 that projects from the core 312 is pulled to unwind the ring 220 and extract it completely.

This enables the sleeve 311 to contract onto the elongate member 225 between the end 317 of the core 312 and the end 317' of the core 312', as shown in FIG. 6.

This contraction produces a thrust on the ends 317 and 317' in reaction to which the core 312 is driven in the direction going from the end 317 to the end 318 whereas the core 312' is driven in the direction going from the end 317' to the end 318'. The driving movement continues until the cores 312 and 312' are fully expelled from the sleeve 311.

The latter then tightly covers the elongate member 225, for which it provides, at and on either side of the splicing member 228, electrical insulation, air-tightness and water-tightness.

Use of the assembly 210 (FIG. 3) on an elongate member such as 225 is similar to use of the assembly 310, the only difference being that the operation that enables the sleeve 211 to contract onto the elongate member between the end 217 of the core 212 and the end 217' of the core 212' is not the tearing of the ring 220 but an action of moving the cores 212 and 212' to make them slide relative to the sleeve 211 in the direction from the end 217 toward the end 218 and in the direction from the end 217' toward the end 218', respectively.

Use of the assembly 10 (FIGS. 1 and 2) on an elongate member such as 225 is similar to use of the assembly 210, the only difference being that it is only the core 12 which is moved such that it slides relative to the sleeve 11 in the direction from the end 17 to the end 18, the sleeve 11 contracting on the elongate member progressively as the core 12 is expelled from the sleeve 11.

In a variant of the assembly 10 that is not shown, the film 13, rather than being present over the whole of the inside perimeter of the core 12, is divided between the end 17 and the end 18 into two sections each of which contracts to form a relatively narrow strip, each of the two strips making a half-turn over the end 18 and being fastened to the sleeve 11 by virtue of the elastic ring 14. The space existing between the two strips directly gives access to the core 12. The operator can thus grasp the core 12, for example to begin expelling the core 12 from the sleeve 11.

Similarly, in order for the operator to be able to grasp the cores 212 and 212' (or 312 and 312'), it is provided in a variant not shown for the films 213 and 213' (or 313 and 313') each to be subdivided into two strips, as explained above for the assembly 10.

In another variant not shown, the assembly 10, 210 or 310 present in the core 12 or in the cores 212, 212' or 312, 312', has, in the vicinity of the end 18 or the ends 218, 218' or 318, 318', one or more holes enabling a hook to be put in place to pull on the core 12 or 212, 212' or 312, 312'.

SUMMARY OF THE INVENTION

The invention aims to provide a similar assembly enabling simple, convenient and precise fitting.

To this end the invention provides an assembly for tightly covering an elongate member of predetermined dimensions with an elastic protection sleeve, comprising:

said sleeve;

Two tubular cores for holding expanded said sleeve, which are disposed end to end, covered tightly by said sleeve, and configured to receive internally said elongate member, each said tubular core extending between a first end and a second end, said first ends facing each other; and for each tubular core, a slide film placed between said sleeve and said each core, to enable each core to slide relative to said sleeve;

said assembly being characterized in that it further comprises a device for holding the two cores in order for them to be able to move apart from each other, from the initial state in which they are end to end, until they are apart at most by a predetermined distance at which the inside diameter of the sleeve between the first ends is at least similar to the inside diameter of the cores, whereby said assembly with the two cores thus apart can still be repositioned.

To perform the fitting of the sleeve on the elongate member inserted into the internal space of the assembly, the cores are acted upon to commence their expulsion by the sleeve.

By virtue of the holding device, the movement of the cores is stopped when they are apart by the predetermined distance.

To terminate the fitting of the sleeve, the action of the holding device is made to stop. The thrust applied by the sleeve on the cores on account of the contraction of the sleeve between the first ends of the cores no longer being taken by the holding device, the cores are then moved again until they are fully expelled from the sleeve.

By causing the action of the holding device to stop while the sleeve is already contracted between the first ends of the cores, the risks are minimized of the sleeve changing position relative to the elongate member between the time at which the action of the holding device is caused to stop and the time at which the sleeve begins to tighten on that member.

In case the sleeve has changed position relative to the elongate member between the initial state of the assembly and the time at which the movement of the cores is stopped by the holding device, the operator may easily reposition the sleeve, since the latter does not yet tightly cover the elongate member.

The fitting of the sleeve may be particularly precise, while being simple and convenient since the implementation of the holding device is without difficulty.

According to advantageous features of implementation of the assembly according to the invention:

said holding device extends externally of the rest of said assembly between two hooks each engaged on the second end of one of said cores;

said holding device comprises a first belt, a second belt and a buckle to fasten together the first belt and the second belt, which buckle comprises a male member forming part of the first belt and a female member forming part of the second belt;

said buckle is configured to vary the length of the holding device when the first belt and the second belt remain fastened to each other by the buckle;

said buckle is configured to have a first position in which the holding device has a first length and to have a second position in which the holding device has a second length, greater than the first length;

said female member has an elongate slot, and said male member and said female member are configured in order for said male member to slide along said slot between said first position and said second position of the buckle;

said first belt comprises a strap fastened to the male member, the width of said slot and the width of said strap being similar;

said female member comprises a head and a body which extends from said head, said slot being formed in said body and, between the slot and the head, holding members for the male member;

said male member is formed by a plate having a contour configured to pass through said slot when said plate is oriented parallel to said slot and otherwise in order for said plate not to be able to pass through said slot; and/or said first belt comprises, in addition to the male member, a strap and a hook, one of the ends of the strap being fastened to the male member and the other end of the strap being fastened to the hook; and the second belt comprises, in addition to the female member, a strap and a hook, one of the ends of the strap being fastened to the female member and the other end being fastened to the hook.

BRIEF DESCRIPTION OF THE DRAWINGS

The disclosure of the invention will now be continued with the detailed description of embodiments, given below by way of illustrative and non-limiting example, with reference to the accompanying drawings, in which:

FIGS. 1 to 6 illustrate prior assemblies already described above;

DETAILED DESCRIPTION OF THE INVENTION

Figure 7:
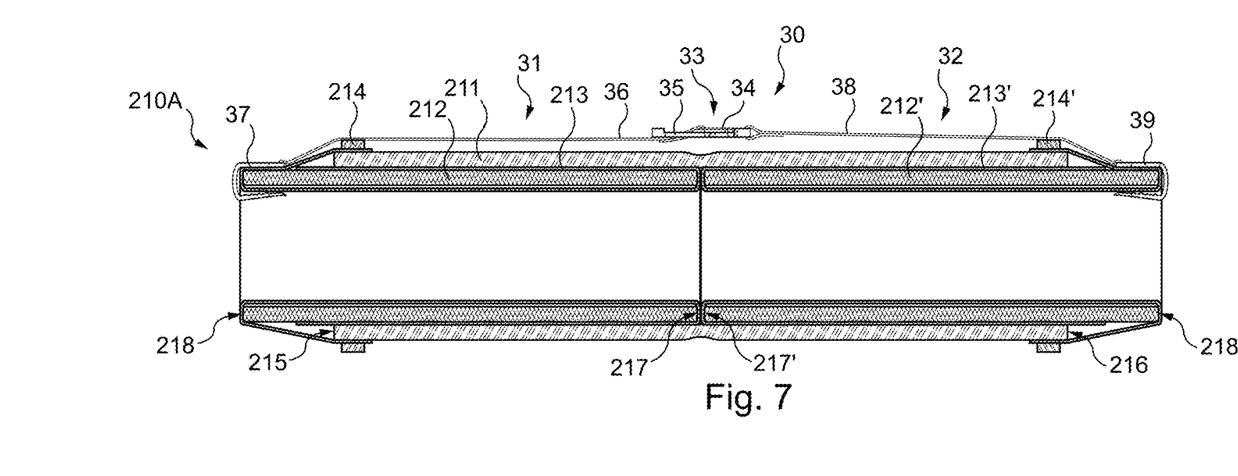
FIG. 7 is a similar view to FIGS. 1, 3 and 4 but showing an assembly in accordance with the invention.

In a general manner, the assembly 210A according to the invention illustrated in FIG. 7 is similar to the prior assembly 210 illustrated in FIG. 3, apart from the fact that a holding device 30 has been added to it.

To simplify, the same numerical references have been kept for the parts of assembly 210A that are similar to the parts of assembly 210.

The device 30 serves to hold the cores 212 and 212'.

The holding device 30 comprises a first belt 31 and a second belt 32 which are provided to be fastened to each other by virtue of a buckle 33 comprising a male member 34 forming part of the first belt 31 and a female member 35 forming part of the second belt 32.

In addition to the male member 34, the first belt 31 comprises a strap 36 and a hook 37. One of the ends of the strap 36 is fastened to the male member 34 and the other end of the strap 36 is fastened to the hook 37.

Similarly, the second belt 32 comprises, in addition to the female member 35, a strap 38 and a hook 39, one of the ends of the strap 38 being fastened to the female member 35 and the other end being fastened to the hook 39.

The hooks 37 and 39 are similar. They each have a U-shaped profile configured for engagement in the neighborhood of the end 218 or 218' of the core 212 or 212'.

Each hook 37 and 39 has at its proximal end an opening which serves for the fastening of the strap 36 or 38: the latter passes through the opening and returns back on itself with, between the two superposed portions, a seam or the like (for example a metal staple) in order for the two superposed portions to be held to each other.

As explained in more detail later, the buckle 33 makes it possible to vary the length of the holding device 30 while the first belt 31 and the second belt 32 remain fastened to each other by the buckle 33.

It should be noted that in the present specification, the length of the holding device 30 means the maximum separation there may be between the hooks 37 and 39 when they are acted upon to move them apart from each other.

Figure 8:
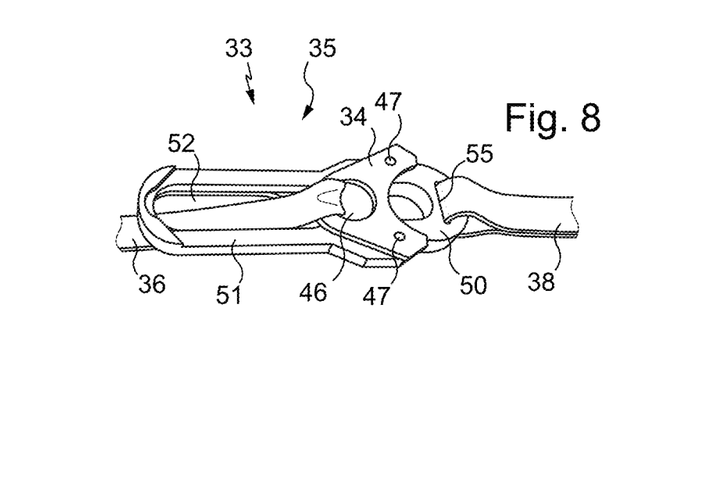
FIG. 8 is a perspective view showing the buckle of the holding device of the cores comprised by the assembly illustrated in FIG. 7.

In a first position of the buckle 33, shown in FIGS. 7 and 8, the holding device 30 has a first length.

Figure 10:
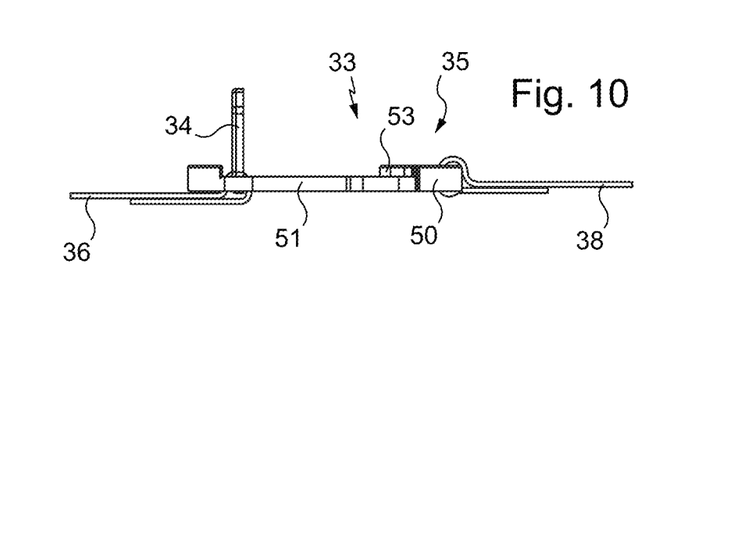
FIG. 10 is a similar view to FIG. 9, but with the female member which has slid in the male member until coming into abutment.
Figure 11:
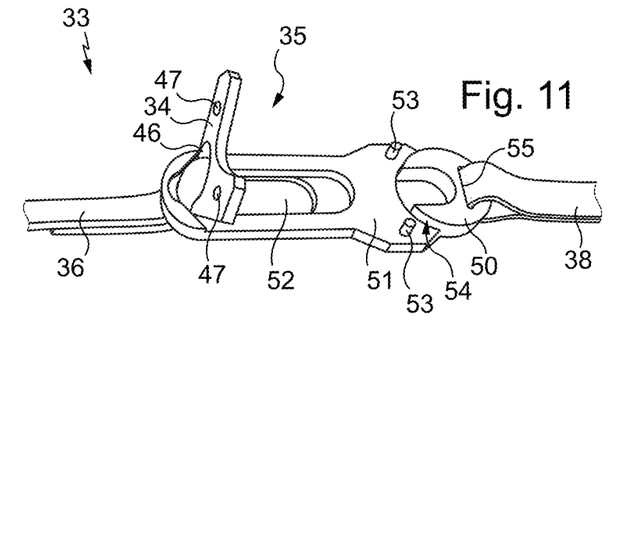
FIG. 11 is a perspective view showing the buckle in the same position as in FIG. 10.
Figures 12, 13, 14:
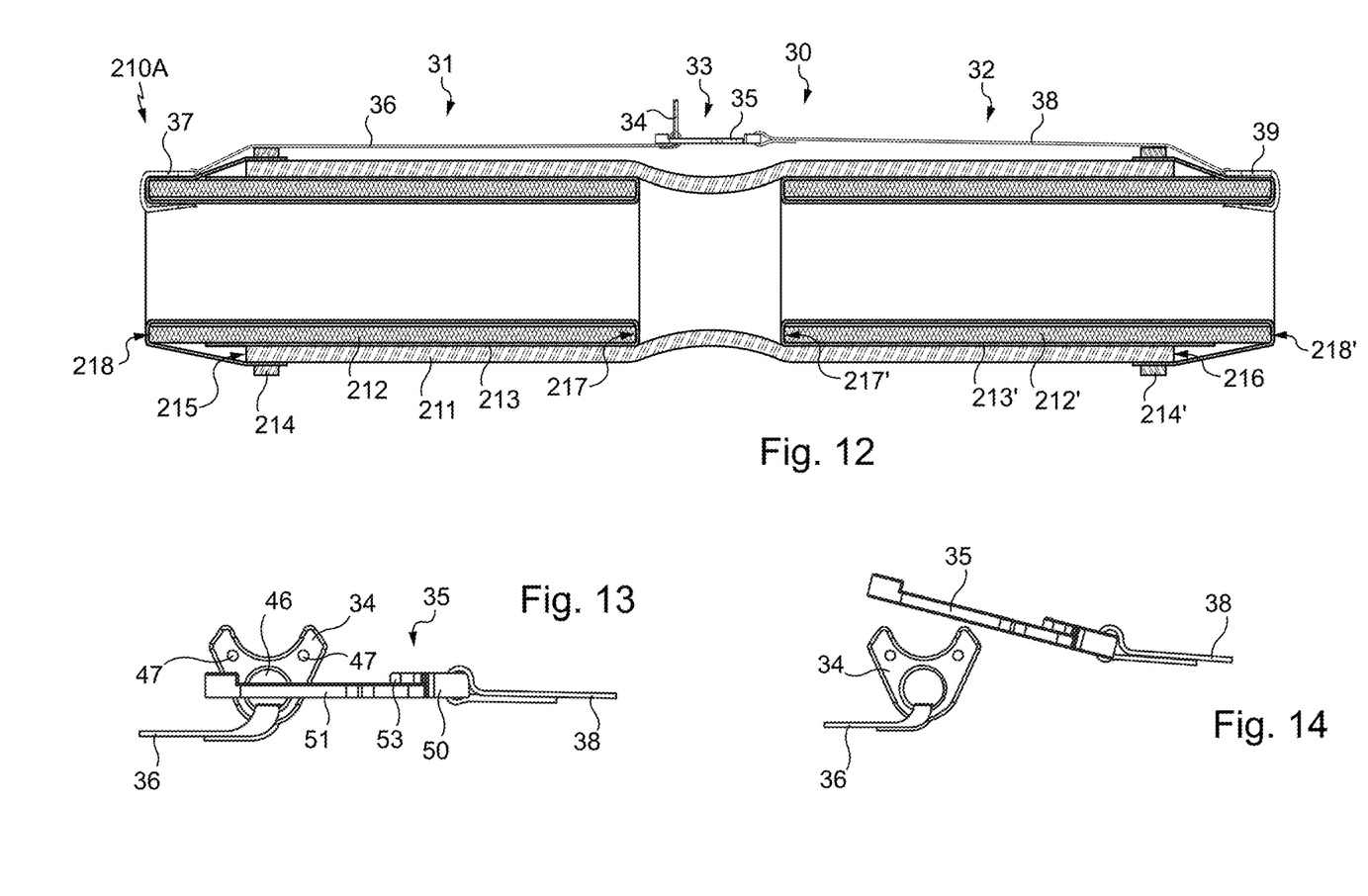
FIG. 12 is a view similar to FIG. 7, but showing the assembly according to the invention in the configuration it takes when the buckle is in the position illustrated in FIGS. 10 and 11.
FIGS. 13 and 14 are views similar to FIGS. 9 and 10, but showing the buckle respectively with the male member in course of being slid through the slot of the female member to be clear therefrom and with the male member clear of the female member.

In a second position of the buckle 33, shown in FIGS. 10, 11 and 12, the holding device 30 has a second length, greater than the first length.

As shown in FIGS. 8 to 11, on passage from the first position to the second position of the buckle 33, the male member 34 and the female member 35 remain fastened to each other.

In the assembly 210A, the hook 37 of the first belt 31 engages on core 212 in the neighborhood of its end 218, and the hook 39 of the second belt 32 engages on the core 212' in the neighborhood of the second end 218'.

The first length of the holding device 30 (buckle in the position shown in FIGS. 7 and 8) is selected in order for the sleeves 212 and 212' to remain disposed end to end, that is to say with the ends 217 and 217' against each other or approximately so.

As can be clearly understood on examining FIG. 12, due to the fact that the second length of the holding device 30 is greater than the first length, the cores 212 and 212' are no longer end to end but away from each other, and therefore the sleeve 211 is contracted between the first ends 217 and 217' of the cores 212 and 212'.

The second length of the holding device 30 (buckle 33 in the position shown in FIGS. 10, 11 and 12) is provided such that the cores 212 and 212' cannot move apart from each other more than a predetermined distance at which the inside diameter of the sleeve 211 is still sufficiently great for the assembly 210A still to be repositionable on an elongate member such as member 225 (FIGS. 5 and 6).

It should be noted that the assembly 210A is still repositionable relative to an elongate member such as 225 disposed in the internal space of the assembly 210A, so long as the inside diameter of the sleeve 211 remains similar to the inside diameter of the cores 212 and 212'.

Indeed, thus, the sleeve 211 does not have any projection or a minimum projection into the internal space of the cores 212 and 212'; and therefore the sleeve 211 does not hinder the sliding of the assembly 210A relative to the elongate member such as 225.

To terminate the fitting of the sleeve 211 onto the elongate member such as 225 disposed in the internal space of the assembly 210A, the action of the holding device 30 is made to stop, here by freeing the male member 34 and the female member 35 relative to each other, as explained in more detail later with reference to FIGS. 13 and 14, in order for the belt 31 and 32 no longer to be fastened to each other.

The holding device 30 then no longer takes the thrust applied by the sleeve 211 on the cores 212 and 212' on account of the contraction of the sleeve 211 between the ends 217 et 217'.

The core 212 is thus driven in the direction going from the end 217 to the end 218 and the core 212' is driven in the direction going from the end 217' to the end 218'.

The driving of the cores 212 and 212' by the sleeve 211 continues until the cores 212 and 212' are fully expelled from the sleeve 211.

It is to be noted that by causing the action of the holding device 30 to stop while the sleeve 211 is already contracted between the ends 217 and 217', the risks are minimized of the sleeve 211 changing position relative to the elongate member such as 225 between the time at which the action of the holding device 30 is caused to stop and the time at which the sleeve 211 begins to tighten on that member.

It will be observed that with the assembly 210 illustrated in FIG. 3, the cores 212 and 212' are directly freed from their initial position where they are end to end. The cores 212 and 212' thus change position to a relatively large extent between the start of the expulsion of the cores and the time at which the sleeve 211 begins to contract on the elongate member such as 225.

There are thus risks of changing position of the assembly 210 relative to the elongate member such as 225 between the start of the expulsion of the cores 212 and 212' and the time at which the sleeve 211 begins to contract on the elongate member such as 225.

If such a change in position of the sleeve 211 occurs, there is no possibility of compensating by repositioning the assembly 210, given that the sleeve is already tight around the elongate member such as 225.

On the contrary, in the assembly 210A, the holding between the two cores 212 and 212' procured by the device 30 enables the sleeve 211 to be repositioned relative to the elongate member such as 225 if a change in position of the sleeve 211 has occurred when the sleeve 211 contracted between the ends 217 and 217'.

Of course, the sleeve 211 can also be repositioned if for another reason, in the configuration illustrated in FIG. 12, the sleeve 211 is not properly positioned relative to the elongate member such as 225.

It should be noted that in the assembly 210A, it is not necessary for the cores 212 and 212' to be expelled simultaneously.

On the contrary, it is possible first of all to perform the expulsion of only one of the cores 212 and 212' with the help of the holding device 30, and then perform the expulsion of the other core.

It will furthermore be noted that in the assembly 310, the employment of the frangible ring 220, which means the strap 222 disposed in the internal space of the assembly 210, requires a certain dexterity from the operator and imposes that a relatively large space be left around the elongate member such as 225.

On the contrary, in the assembly 210A, the device 30 is place on the outside (only the distal end of the hooks 37 and 39 is in the internal space of the assembly 210A); and the implementation of the holding device 30 is performed from the outside. Therefore, the elongate member such as 225 may have external bulk very close to the inside diameter of the cores 212 and 212'.

The buckle 33 of the holding device 33 will now be described in detail.

The male member 34 of the buckle 33 is formed by a plate having a crescent-shaped overall contour. In this plate there is formed a central opening 46 of relatively large diameter and two apertures 47 of relatively small diameter, each situated near one end.

The central opening 46 serves for the fastening between the male member 34 and the strap 36: the latter passes through the opening 46 and returns back on itself with, between the two superposed portions, a seam or the like (for example a metal staple) in order for the two superposed portions to be held to each other.

The apertures 47 are provided to receive nipples 53 of the female member 35 in order to hold the buckle 33 in its first position shown in FIGS. 7 and 8.

The female member 35 of the buckle 33 comprises a head 50 and a body 51 which extends from the head 50.

The body 51 has an elongate slot 52 of which the width corresponds to that of the strap 36. The width of the slot 52 is furthermore greater than the thickness of the plate that forms the male member 34.

Between the slot 52 and the head 50, the body 51 has two nipples 53.

The surface from which project the nipples 53 and the surfaces which pass alongside the slot 52 are flush with each other.

At the junction between the body 51 and the head 50, the female member 35 has a shoulder 54 (FIG. 11).

The head 50 has an opening 55.

The opening 55 serves for the fastening between the female member 35 and the strap 38: the latter passes through the opening 55 and returns back on itself with, between the two superposed portions, a seam or the like (for example a metal staple) in order for the two superposed portions to be held to each other.

In the first position of the buckle 33 (FIGS. 7 and 8), the strap 36 passes through the slot 52 and the plate which forms the male member 34 is against the surface of the female member 35 from which project the nipples 53, with each aperture 47 receiving one of the nipples. The concave part of the contour of the plate which forms the male member 34 is against the shoulder 54, which is of complementary shape.

To associate the male member 34 and the female member 35 in order to put the buckle 33 in the first position (FIGS. 7 and 8), the plate which form the male member 34 is passed into the slot 52, of course by orienting that plate parallel to the slot 52, then the orientation of the plate is changed by a quarter turn to put it flat on the part of the body 51 situated between the slot 52 and the head 50, while engaging each nipple 53 in a respective orifice 47.

This engagement is slightly tight, such that the male member and the female member remain associated with each other.

The possible pulling forces applied on the buckle 33 by the straps 36 and 38 are taken thanks to the nipples 53 engaged in the apertures 47, which are oriented transversely to those forces.

Figure 9:
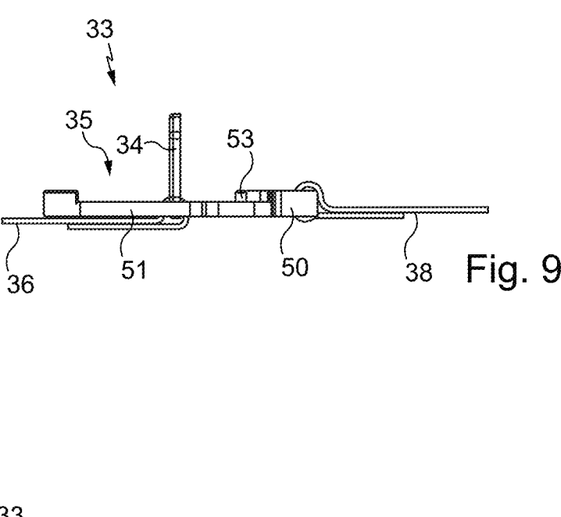
FIG. 9 is a side view showing that buckle in a position in which the male member has just been raised relative to the female member.

To pass the buckle 33 from the first position (FIGS. 7 and 8) to the second position (FIGS. 10 to 12), the male member 34 is raised as shown in FIG. 9, that is to say that it is passed from its orientation flat on the surface from which project the nipples 53 to an orientation in which it is upright relative to that surface.

The male member 34 is thus free from the nipples 53 but it cannot pass through the slot 52 since it is wider than it.

If a pulling force is applied to the straps 36 and 38, for example if the cores 212 and 212' begin to be expelled from the sleeve 211, the male member 34 and the strap 36 slide relative to the female member 35 while being guided by the periphery of the slot 52 until reaching the abutment position illustrated in FIGS. 10 to 12, in which the male member 34 and the strap 36 are at the end of the slot 52 the furthest from the head 50.

To free the male member 34 from the female member 35, the male member 34 is made to perform a quarter turn in order for it to be oriented parallel to the slot 52. The male member 34 may then pass through the slot 52, as shown in FIGS. 13 and 14.

The holding device 30 is put in place on the rest of the assembly 210A with the buckle 33 in the second position (FIGS. 10 to 12) and thus the holding device 30 able to have the second length, such that the putting in place of the hooks 37 and 39 on the ends 218 and 218' of the cores 212 and 212' is possible. Next, the holding device 30 is tensioned by putting the buckle 33 in the first position (FIGS. 7 and 8).

In variants that are not illustrated:

the dimensions and the conformation of the sleeve such as 211, of the core such as 212 or 212', or of the film such as 213 or 213' are different, for example the elastic sleeve externally comprises fins of frusto-conical general shape when it is placed on an elongate member such as 225;

the slide film such as 213 or 213' is other than a film with a low coefficient of friction, for example a tubular net as described in French patent application 2 945 67;

the arrangement of the slide films is different, for example they do not engage on the ends of the sleeve and/or cooperate with an elastic link as described in French patent application 2 791 480;

the male member such as 34 has another conformation, for example T-shaped or butterfly-shaped;

the female member such as 35 has another conformation, for example with holding members for the female member which are different from the nipples such as 53, for example a snap-engagement lug; and/or the holding device 30 is arranged differently, for example with only one strap between the male member and the female member, provided to pass within the internal space of the member such as 210A.

Numerous other variants are possible according to circumstances, and in this connection it is to be noted that the invention is not limited to the examples described and shown.

The invention claimed is:

1. An assembly for tightly covering an elongate member of predetermined dimensions with an elastic protection sleeve, comprising:

said sleeve;

two tubular cores for holding expanded said sleeve, the two tubular cores being disposed end to end, covered tightly by said sleeve, and configured to receive internally said elongate member, each tubular core extending between a first end and a second end, said first ends facing each other; and for each tubular core, a slide film placed between said sleeve and said each core, to enable each core to slide relative to said sleeve;

wherein said assembly further comprises a holding device holding the two cores and allowing the two cores, with the elongate member located inside the two cores and the sleeve, to move apart from each other, i) from an initial state in which the first ends of the two cores are end to end, and the two cores and the sleeve are repositionable around the elongate member contained therein, the sleeve having an initial inside diameter determined by an outside diameter of the two cores and a thickness of the slide film, ii) until a second state where the first ends of the two cores are spaced-apart from each other by a predetermined maximum separation distance which defines a region where the inside diameter of the sleeve between the first ends is a reduced inside diameter that i) is less than the initial inside diameter and ii) is less than the outside diameter of the two cores and at least equal to an inside diameter of the two cores, wherein within said region between the two cores, the sleeve is free of any projection into an internal space of the region along an extension of the inside diameter of the two cores, whereby in the second state, the two cores and the sleeve can still be repositioned around the elongate member contained therein, the holding device preventing the two cores from moving apart more than the predetermined maximum separation distance.

2. The assembly according to claim 1, wherein said holding device extends externally of the rest of said assembly between two hooks, respectively a first hook engaged on a second end of a first core and a second hook engaged on a second end of a second core.

3. The assembly according to claim 1, wherein said holding device comprises a first belt, a second belt and a buckle to fasten together the first belt and the second belt, which buckle comprises a male member forming part of the first belt and a female member forming part of the second belt.

4. The assembly of claim 1, wherein in the initial state in which the first ends of the two cores are end to end, a portion of the slide film at the first end of a first of two tubular cores is directly adjacent to a portion of the slide film at the first end of a second of two tubular cores.

5. An assembly for tightly covering an elongate member of predetermined dimensions with an elastic protection sleeve, comprising:
said sleeve;
two tubular cores for holding expanded said sleeve, the two tubular cores being disposed end to end, covered tightly by said sleeve, and configured to receive internally said elongate member, each tubular core extending between a first end and a second end, said first ends facing each other; and
for each tubular core, a slide film placed between said sleeve and said each core, to enable each core to slide relative to said sleeve;
wherein said assembly further comprises a holding device holding the two cores and allowing the two cores, with the elongate member located inside the two cores and the sleeve, to move apart from each other, i) from an initial state in which the first ends of the two cores are end to end, and the two cores and the sleeve are repositionable around the elongate member contained therein, the sleeve having an initial inside diameter determined by an outside diameter of the two cores and a thickness of the slide film, ii) until a second state where the first ends of the two cores are spaced-apart from each other by a predetermined maximum separation distance which defines a region where the inside diameter of the sleeve between the first ends is a reduced inside diameter that i) is less than the initial inside diameter and ii) is less than the outside diameter of the two cores and at least equal to an inside diameter of the two cores, wherein within said region between the two cores, the sleeve is free of any projection into an internal space of the region along an extension of the inside diameter of the two cores, whereby in the second state, the two cores and the sleeve can still be repositioned around the elongate member contained therein, the holding device preventing the two cores from moving apart more than the predetermined maximum separation distance,
wherein said holding device comprises a first belt, a second belt and a buckle to fasten together the first belt and the second belt, wherein the buckle comprises a male member forming part of the first belt and a female member forming part of the second belt.

6. The assembly according to claim 5, wherein said buckle is configured to vary the length of the holding device when the first belt and the second belt remain fastened to each other by the buckle.

7. The assembly according to claim 6, wherein said buckle is configured to have a first position in which the holding device has a first length and to have a second position in which the holding device has a second length, greater than the first length.

8. The assembly according to claim 7, wherein said female member has an elongate slot, and said male member and said female member are configured in order for said male member to slide along said slot between said first position and said second position of the buckle.

9. The assembly according to claim 8, wherein said first belt comprises a strap fastened to the male member, a width of said slot and the width of said strap being similar.

10. The assembly according to claim 9, wherein said female member comprises a head and a body which extends from said head, said slot being formed in said body and, between the slot and the head, holding members for the male member.

11. The assembly according to claim 9, wherein said male member is formed by a plate having a contour configured to pass through said slot when said plate is oriented parallel to said slot and otherwise in order for said plate not to be able to pass through said slot.

12. The assembly according to claim 9, wherein the first belt comprises, in addition to the male member, a strap and a hook, one of the ends of the strap being fastened to the male member and the other end of the strap being fastened to the hook; and the second belt comprises, in addition to the female member, a strap and a hook, one of the ends of the strap being fastened to the female member and the other end being fastened to the hook.

13. The assembly according to claim 8, wherein said female member comprises a head and a body which extends from said head, said slot being formed in said body and, between the slot and the head, holding members for the male member.

14. The assembly according to claim 13, wherein said male member is formed by a plate having a contour configured to pass through said slot when said plate is oriented parallel to said slot and otherwise in order for said plate not to be able to pass through said slot.

15. The assembly according to claim 13, wherein the first belt comprises, in addition to the male member, a strap and a hook, one of the ends of the strap being fastened to the male member and the other end of the strap being fastened to the hook; and the second belt comprises, in addition to the female member, a strap and a hook, one of the ends of the strap being fastened to the female member and the other end being fastened to the hook.

16. The assembly according to claim 8, wherein said male member is formed by a plate having a contour configured to pass through said slot when said plate is oriented parallel to said slot and otherwise in order for said plate not to be able to pass through said slot.

17. The assembly according to claim 8, wherein the first belt comprises, in addition to the male member, a strap and a hook, one of the ends of the strap being fastened to the male member and the other end of the strap being fastened to the hook; and the second belt comprises, in addition to the female member, a strap and a hook, one of the ends of the strap being fastened to the female member and the other end being fastened to the hook.

18. The assembly according to claim 7, wherein the first belt comprises, in addition to the male member, a strap and a hook, one of the ends of the strap being fastened to the male member and the other end of the strap being fastened to the hook; and the second belt comprises, in addition to the female member, a strap and a hook, one of the ends of the strap being fastened to the female member and the other end being fastened to the hook.

19. The assembly according to claim 6, wherein the first belt comprises, in addition to the male member, a strap and a hook; one of the ends of the strap being fastened to the male member and the other end of the strap being fastened to the hook; and the second belt comprises, in addition to the female member, a strap and a hook, one of the ends of the strap being fastened to the female member and the other end being fastened to the hook.

20. The assembly according to claim 5, wherein the first belt comprises, in addition to the male member, a strap and a hook, one of the ends of the strap being fastened to the male member and the other end of the strap being fastened to the hook; and the second belt comprises, in addition to the female member, a strap and a hook, one of the ends of the strap being fastened to the female member and the other end being fastened to the hook.

* * * * *

UNITED STATES PATENT AND TRADEMARK OFFICE
CERTIFICATE OF CORRECTION

PATENT NO. : 10,242,772 B2
APPLICATION NO. : 14/859963
DATED : March 26, 2019
INVENTOR(S) : Hubert Laversane, Piotr Gorecki and Stephane Areias Page 1 of 1

It is certified that error appears in the above-identified patent and that said Letters Patent is hereby corrected as shown below:

On the Title Page

Item (73), delete:
"(73) Assignee: SOCIETE INDUSTRIELLE DE
CONSTRUCTION D'APPARIELS
ET DE MATERIEL ELECTRIQUES,
Pompdour (FR)"

And insert:
--(73) Assignee: SOCIETE INDUSTRIELLE DE
CONSTRUCTION D'APPAREILS
ET DE MATERIEL ELECTRIQUES
Pompadour (FR)--.

Signed and Sealed this
Twenty-fourth Day of December, 2019

Andrei Iancu
*Director of the United States Patent and Trademark Office*